United States Patent
Cheng et al.

(10) Patent No.: US 10,592,972 B2
(45) Date of Patent: Mar. 17, 2020

(54) GRAPHIC TRANSACTION METHOD AND SYSTEM FOR UTILIZING THE SAME

(71) Applicant: ZEROPLUS TECHNOLOGY CO., LTD., New Taipei (TW)

(72) Inventors: Chiu-Hao Cheng, New Taipei (TW); Tien-Yu Wu, Kaohsiung (TW)

(73) Assignee: ZEROPLUS TECHNOLOGY CO., LTD., New Taipei (TW)

( * ) Notice: Subject to any disclaimer, the term of this patent is extended or adjusted under 35 U.S.C. 154(b) by 262 days.

(21) Appl. No.: 15/650,395

(22) Filed: Jul. 14, 2017

(65) Prior Publication Data
US 2018/0053245 A1    Feb. 22, 2018

Related U.S. Application Data

(60) Provisional application No. 62/376,054, filed on Aug. 17, 2016.

(30) Foreign Application Priority Data

May 3, 2017  (TW) .............................. 106114656 A (51) Int. Cl.
*G06Q 30/00*   (2012.01)
*G06Q 30/06*   (2012.01)

(52) U.S. Cl.
CPC ..... *G06Q 30/0643* (2013.01); *G06Q 30/0633* (2013.01)

(58) Field of Classification Search
CPC .............................................. G06Q 30/06–08
(Continued)

(56) References Cited

U.S. PATENT DOCUMENTS

| 5,748,484 A * | 5/1998 | Cannon ................. | G06Q 30/02 700/233 |
| 2014/0081806 A1* | 3/2014 | Tedesco ................. | G06Q 30/06 705/26.61 |

(Continued)

FOREIGN PATENT DOCUMENTS

| CN | 104317828 A | 1/2015 |
| TW | 201403519 A | 1/2014 |

OTHER PUBLICATIONS

Examination Report for TW106114656, dated May 31, 2018, Total of 2 pages.
(Continued)

*Primary Examiner* — Ethan D Civan
(74) *Attorney, Agent, or Firm* — R. Lynette Wylie; Apex Juris, pllc.

(57) ABSTRACT

A graphic transaction method and a system for utilizing the same are disclosed. The graphic transaction method includes steps of: photographing a product corresponding to at least one sales target to form at least one first graphic; providing the at least one first graphic to a customer's side; receiving a second graphic transmitted back from the customer's side, the second graphic including the at least one first graphic on which a first tag is added by the customer's side; and identifying the second graphic and generating a first list according to the first tag. Whereby, the construction of transaction model between mutual sides is based on graphics. It can provide intuition-type transaction experience and can be applied to various sales targets of different sellers.

13 Claims, 5 Drawing Sheets

(58) Field of Classification Search
USPC .............................................. 705/26.1–27.2
See application file for complete search history.

(56) References Cited

U.S. PATENT DOCUMENTS

2014/0165086 A1     6/2014  Avedissian et al.
2016/0335692 A1*   11/2016  Yamartino ......... G06Q 30/0625

OTHER PUBLICATIONS

Search Report for TW106114656, dated May 31, 2018, Total of 1 page.
English Abstract for CN104317828, Total of 1 page.
English Abstract for TW201403519, Total of 1 page.

* cited by examiner

GRAPHIC TRANSACTION METHOD AND SYSTEM FOR UTILIZING THE SAME

BACKGROUND OF THE INVENTION

1. Technical Field

The present invention is related to a transaction method and a system for utilizing the same, and more particularly to a graphic transaction method and a system for utilizing the same.

2. Description of Related Art

With the advance of technology, whether it is the sale of merchandise stores, the service of the restaurant meals, or the supply of services, etc., are gradually moving towards technology-based transaction model, such as point-of-sale systems (POS) are built up for the stores of large, chain enterprises.

For example, for the restaurant stores, when a meal system is to be built up, since each store has its different meals and product information, it is necessary to input various types of prices and meals into the system, and the meal system must be customized according to the property of each store. Therefore, it is not only troublesome but also unsatisfactory in economic benefits in building up such a system. Especially for smaller stores, it would be a large cost in maintaining its business.

However, in the prior arts, it still lacks a method for proving a simple transaction model, which can be produced in a modularized method and can be applied to all kinds of different stores.

BRIEF SUMMARY OF THE INVENTION

In view of the above, the present invention is to provide a graphic transaction method and a system for utilizing the same, which can be produced with a modularized method and applied to various types of sellers.

The present invention provides a graphic transaction method, which includes steps of: photographing a product corresponding to at least one sales target to form at least one first graphic; providing the at least one first graphic to a customer's side; receiving a second graphic transmitted back from the customer's side, the second graphic including the at least one first graphic on which a first tag is added by the customer's side; and identifying the second graphic and generating a first list according to the first tag.

The present invention also provides a graphic transaction system, which includes a first electronic device, adapted to photographing a product corresponding to at least one sales target to form a first graphic; a server, connected with the first electronic device and adapted to receive and store the first graphic transmitted from the first electronic device; and a second electronic device, connected with the server, the second electronic device being adapted to receive the first graphic from the server, generate a second graphic by adding a first tag to the first graphic, and transmit the second graphic back to the server.

The present invention further provides a graphic transaction system, which includes a first electronic device, adapted to photograph a product corresponding to at least one sales target to form a first graphic; a server, connected with the first electronic device and adapted to receive and store the first graphic transmitted from the first electronic device; and a second electronic device, connected with the server, the second electronic device being adapted to receive the first graphic from the server, add a first tag to the first graphic, and transmit the first tag back to the server; wherein, the server is further adapted to receive the first tag, generate a second graphic by editing the first graphic and the first tag, and providing the second graphic to the first electronic device.

The advantage of the present invention lies in utilizing a graphical method to construct sales target related graphics. The graphics can be provided for the users to make decisions or add tags. After identifying the graphics transmitted back from the users and the tags added thereon, a list of the user's demand can be obtained.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A graphic transaction method of an embodiment of the present invention includes steps of: A. obtaining images of a product corresponding to a sales target to generate at least one first graphic; B. providing the at least one first graphic to a customer's side; C. receiving a second graphic from the customer's side, wherein the second graphic includes the at least one image and a first tag added by the customer's side; and D. recognizing the second graphic having the first tag to generate a first list.

Wherein, in step A and step B, a seller can capture images of the product corresponding to a sales target by utilizing a first electronic device, such as an image capturing device. The first electronic device includes mobile devices, smartphones, tablet computers, scanners, and printers, etc., which can obtain image information of the product corresponding to the sales target by methods of photographing, video recording, scanning, or printing, etc. Wherein, the sales target is not limited to merchandises, and can include a type of service. The product to be captured is not limited to physical objects, and can include a product sheet with product items or product prices.

In one embodiment, after obtaining an original graphic by capturing images of the product corresponding to the sales target, the seller can add a description tag to the original graphic to generate the first graphic which includes the original graphic and the description tag added thereon. Wherein, the description tag can include information such as model numbers, inventories, sizes and/or prices, but it is not limited thereto.

Next, the seller can provide the first graphic to the customer's side which has a second electronic device, such as smartphones or tablet computers, etc., and the first graphic is browsed by the user. Wherein, a method for providing the first graphic includes transmitting the first graphic to the customer's side directly, or uploading the first graphic image to a server or a cloud storage for the customer's side to download the first graphic. In addition, the seller can cooperate with an administration end to connect the first electronic device to one server of the administration end and upload the first graphic to the server. Wherein, the administration end can build up a sales platform having information of one store or multiples stores according to the first graphic provided by the seller; the administration end also can provide application programs related to the sales platform for customers to download, or can provide websites related to the sales platform for customers to browse so as to provide the first graphic corresponding to the sales target of the seller to the customer's side. Meanwhile, the customer's side can connect to the sales platform and choose a seller to interact with the first graphic of the sales target according to his preference. More detail, the above-mentioned sales platform can be a server of a communication software. The customer's side can obtain the first graphic by connecting to the server of the communication software. Wherein, the first graphic can be transmitted from the server to the customer's side upon receiving a request sent by the customer's side, or the first graphic can be automatically transmitted from the server to the customer's side when the customer's side connects to the server.

Besides, the first graphic is not limited to one single graphic. For example, the first graphic can include multiple captured images of the product corresponding to at least one sales target so as to form a first video having the multiple captured images. Wherein, the first graphic can be a series of graphics, but it is not limited thereto. The first video can be a video composed of several first graphics corresponding to different sales targets. Then, the seller can provide the first video to the customer's side for the customer's side to choose a product as the method of transmitting the first graphic. Wherein, before proving the first video, the seller can add a description tag to the first video so as to provide information of the sizes, model numbers or prices, etc. of the sales target included in the first video. The description tag can be letters, drawings or audios, but it is not limited thereto.

In step C, the seller can receive a second graphic transmitted from the customer's side, wherein the second graphic includes the first graphic and a first tag added to the first graphic by the customer's side. Wherein, the customer's side includes a second electronic device, such as smartphones or tablet computers. When the customer's side obtains or downloads the first graphic, for example, the second electronic device connects to the server and downloads the first graphic, the customer's side can edit the first graphic, including adding the first tag including letters, symbols, or handwriting, etc. to the first graphic, to form the second graphic composed of the first graphic and the first tag, and transmit the second graphic back to the seller or the server. Wherein, the first tag includes messages or purchasing information to be provided to the seller from the customer's side, but it is not limited thereto. Besides, in other embodiments, the second electronic device can transmit the first tag back to the server only. After receiving the first tag, the server can combine the first graphic and the first tag into the second graphic, and transmit the second graphic to the first electronic device of the seller.

It is worth to mention that when the customer's side receives the first video and watches the first video, the customer's side can capture one image by stopping the first video at any time to form the first graphic. Then, the customer's side can add the first tag to the first graphic to generate the second graphic. Preferably, when the customer's side captures the first graphic, a time-scale or a time-stamp corresponding to the first graphic, and sales target information shown in the first graphic can be recorded and transmitted back to the seller such that the information can be known by the seller. Wherein, the first tag can be letters, drawings, or audios, but it is not limited thereto. It is worth to mention that the customer's side can capture more than one graphic. In some embodiments, the customer's side can capture multiple graphics and link the multiple graphics with the first tag to form a dynamic, second graphic or to form a video composed of the multiple graphics. Then, the second graphic or the video is transmitted back to the server.

After the first electronic device or the server of the seller receiving the second graphic, step D is performed to recognize the second graphic so as to generate a first list according to the first tag. For example, the second graphic can be recognized manually to identify a correspondence between the first tag and a sales target related to the first tag in the second graphic, and to generate the first list. In another example, the second graphic can be analyzed with an image recognition system so as to identify a correspondence between the first tag and a sales target related to the first tag in the second graphic, and to generate the first list. Wherein, the first list includes related information and specification of the sales target chosen by the customer's side, but it is not limited thereto.

Figure 1:
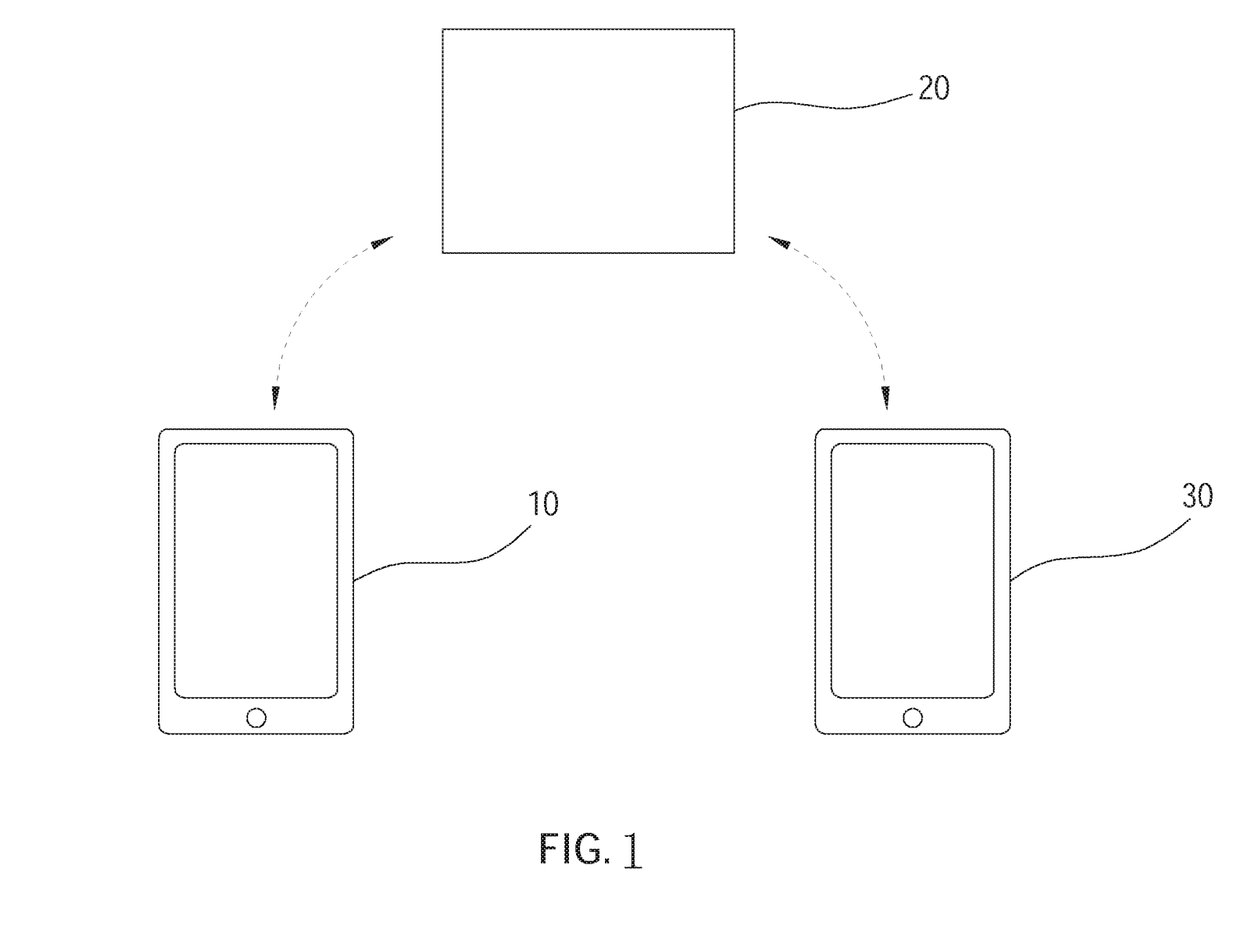
FIG. 1 is schematic view of a graphic transaction method of a first embodiment according to the present invention.
Figure 2:
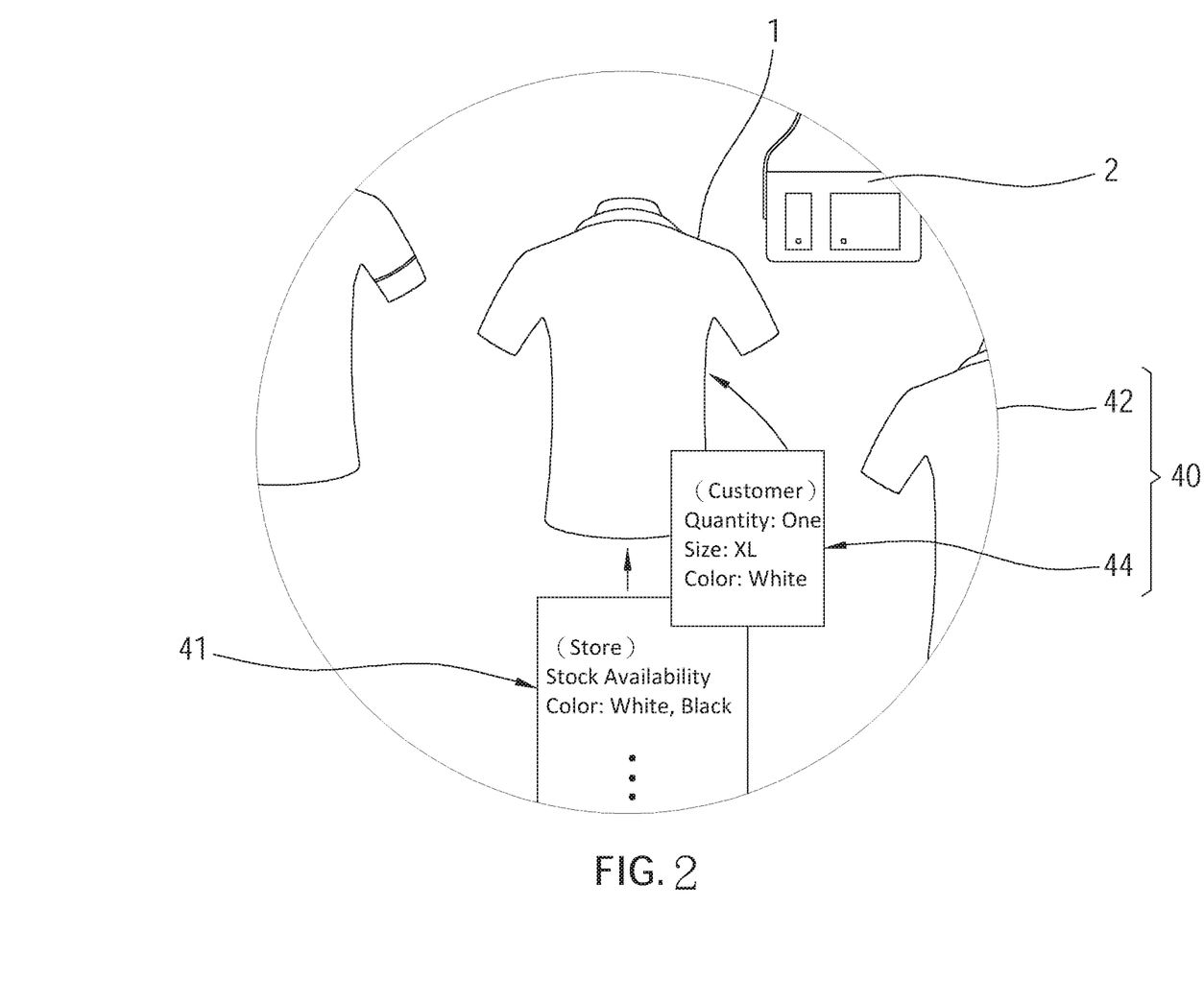
FIG. 2 is a schematic view of a second graphic shown on an electronic device of the first embodiment.

The following embodiment and drawings are provided to clearly illustrate the disclosure of the present invention. As shown in FIG. 1 and FIG. 2, a graphic transaction system of a first embodiment according to the present invention is illustrated. The graphic transaction system utilizes a graphic transaction method of the present invention. The graphic transaction system includes a first electronic device 10 which is utilized by a seller, a server 20, and a second electronic device 30 which represents a customer's side. Wherein, the first electronic device 10, the second electronic device 30 can be smartphones, tablet computers, or notebooks, but it is not limited thereto.

In this embodiment, for example, the seller is a clothing store. In other applications, it is not limited thereto. First, the seller can capture images of the merchandises to be sold by utilizing the first electronic device 10 and store the captured images as a first graphic. For example, in this embodiment, the seller captures images of multiple sales targets, such as a clothing 1, and a backpack 2, and stores the captured images as a first graphic 42. The first graphic 42 can be stored as a panoramic image, for example, but it is not limited thereto. Then, the seller can upload the first graphic 42 to the server 20 with the first electronic device 10 to enable the customer's side to obtain the first graphic 42 through internet connection. Besides, in other embodiments, the seller can store multiple first graphics which respectively correspond to each of the sales targets, in addition to including multiple sales targets in a single graphic. In this embodiment, the server 20 is a server of a communication software. Thus, the seller can perform an application program of the communication software on the first electronic device 10, and can set up an on-line store to be browsed by other users of the communication software.

In addition, after obtaining an original graphic by capturing images of the products corresponding to the sales targets, the seller can add a description tag 41 to the original graphic, as shown in FIG. 2. Wherein, the description tag 41 can include information of model numbers, inventories, sizes and/or prices corresponding to the sales targets, etc. The first graphic 42 can include the original graphic and the description tag 41.

On the customer's side, the user, such as a customer, can download the first graphic 42 by connecting to the server 20 with the second electronic device 30. For example, the customer can enter the seller's on-line store by performing the application program of the communication software. After the customer entering the on-line store, a dialogue window corresponding to the seller can be opened and shown on the second electronic device 30 of the customer, and the server 20 can provide the first graphic 42 on the dialogue window automatically or passively. Wherein, since the first graphic is a panoramic image, the user can adjust a viewing angle of the first graphic according to his demand, and can tag one or more interested sales targets included in the first graphic. For example, as shown in FIG. 2, the first graphic 42 shown on the second electronic device 30 of the customer's side is illustrated, wherein, the user can edit the first graphic 42 shown on the second electronic device 30. For example, the user can add a first tag 44 to the chosen sales target, such as the clothing 1. Wherein, in this embodiment, the first tag 44 includes an arrow pointed to the clothing 1, and quantity and size of the clothing 1. However, the first tag 44 can include other types of notes or information, and it is not limited thereto. Moreover, for the convenience of identifying the first tag 44 by the users, including the customer's side and/or the seller, a message board having the chosen information can be added into the first tag 44. However, in other applications, it is not limited thereto. In addition, in one embodiment, the first tag 44 can be a layer formed on the first graphic 42 so as to perform edition or increment/decrement to the first tag 44.

Next, after editing the first tag 44 with the second electronic device 30 by the user, the second electronic device 30 can combine the first graphic 42 and the first tag 44 into a second graphic 40, and transmit the second graphic 40 back to the server or the on-line store of the seller via the dialogue window. Then, the seller can download the second graphic 40 from the server 20 or the on-line store with the first electronic device 10, and identity the second graphic 40 to obtain a correspondence between the first tag 44 and the sales target corresponding to the first tag 44 so as to generate a first list.

Wherein, in this embodiment, the user at the seller's side can manage his on-line store and download the second graphic 40 from the server 20 of the communication software with the first electronic device 10. The user at the seller's side can obtain the information sent from the customer's side according to the first tag 44 on the second graphic 40. The user at the seller's side also can link the first tag 44 of the second graphic 40 with its corresponding sales targets, such as the clothing 1, so as to generate a first list including the sales targets and sale the corresponding sales targets to the customer.

Moreover, for identifying the second graphic 40, in addition to transmitting to the first electronic device 10 to be identified by the user at the seller's side, the second graphic 40 can be identified by an image recognition system (not shown) provided by the server 20. The server 20 also can generate the first list according to the first tag 44 and its corresponding sales targets and transmit the first list to the first electronic device 10 for the seller to review.

From the above, the advantage of the graphic transaction method of the present invention is that the seller can exhibit the sales targets by utilizing his own electronic devices, such as smartphones or cameras, to build up the graphic files corresponding to the sales targets and upload the files to a server 20, or to build up an on-line store including the graphic files which can browsed and downloaded by the customer's side. For the consumers, i.e., the customer's side, after downloading the first graphic, the consumers can select and purchase the sales targets, and add the first tag directly with their intuition. Then, by utilizing the linkage between the graphics and the tags, the seller can know the selected sales targets and the demands of the consumers according to the second graphic 40 having the first graphic 42 and the first tag 44 rapidly and intuitively. It is worth to mention that the aforementioned tags can be generated by the user via typing manners such as letters or symbols with electronic devices, or can be generated by the user via forming stampings, patterns or drawings on corresponding positions on the graphics, such as the user touches the screen to trigger formation of corresponding stampings, patterns or drawings on the touched positions of the user. However, it is not limited thereto. The aforementioned tags also can be generated by dragging a predetermined stamping, pattern or drawing to an arbitrary position on the graphic by the user. Wherein, there can be plural stampings, patterns or drawings, and each of the plural stampings, patterns or drawings respectively represents a meaning of purchasing, quantity, or size, etc.

Figure 3:
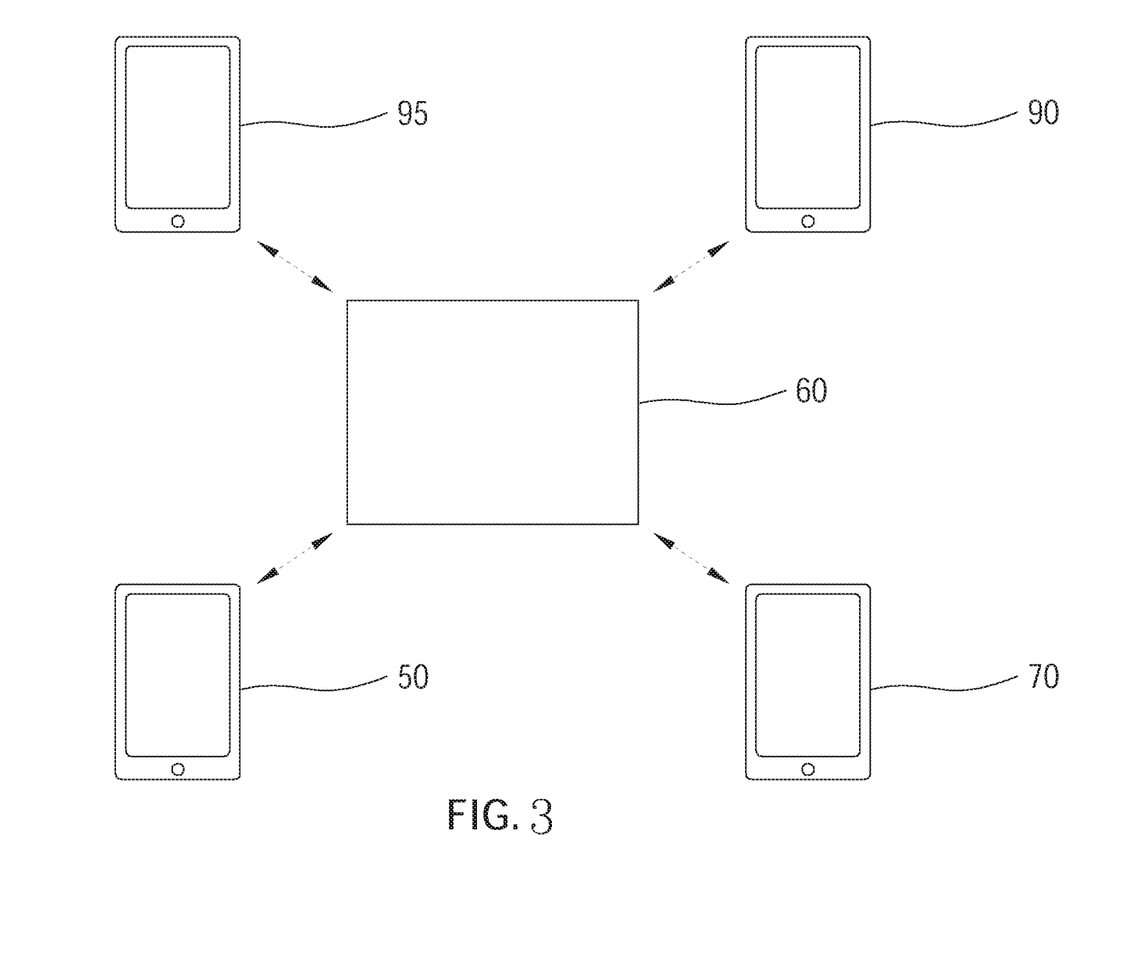
FIG. 3 is a schematic view of a graphic transaction method of a second embodiment according to the present invention.

As shown in FIG. 3, a graphic transaction system of a second embodiment according to the present invention is illustrated. Wherein, the graphic transaction system utilizes a graphic transaction method of the present invention. The basic configuration of the graphic transaction system includes a first electronic device 50 used by a seller, a host 60 utilized as a server, and a second electronic device 70 used by a customer's side.

Figure 4:
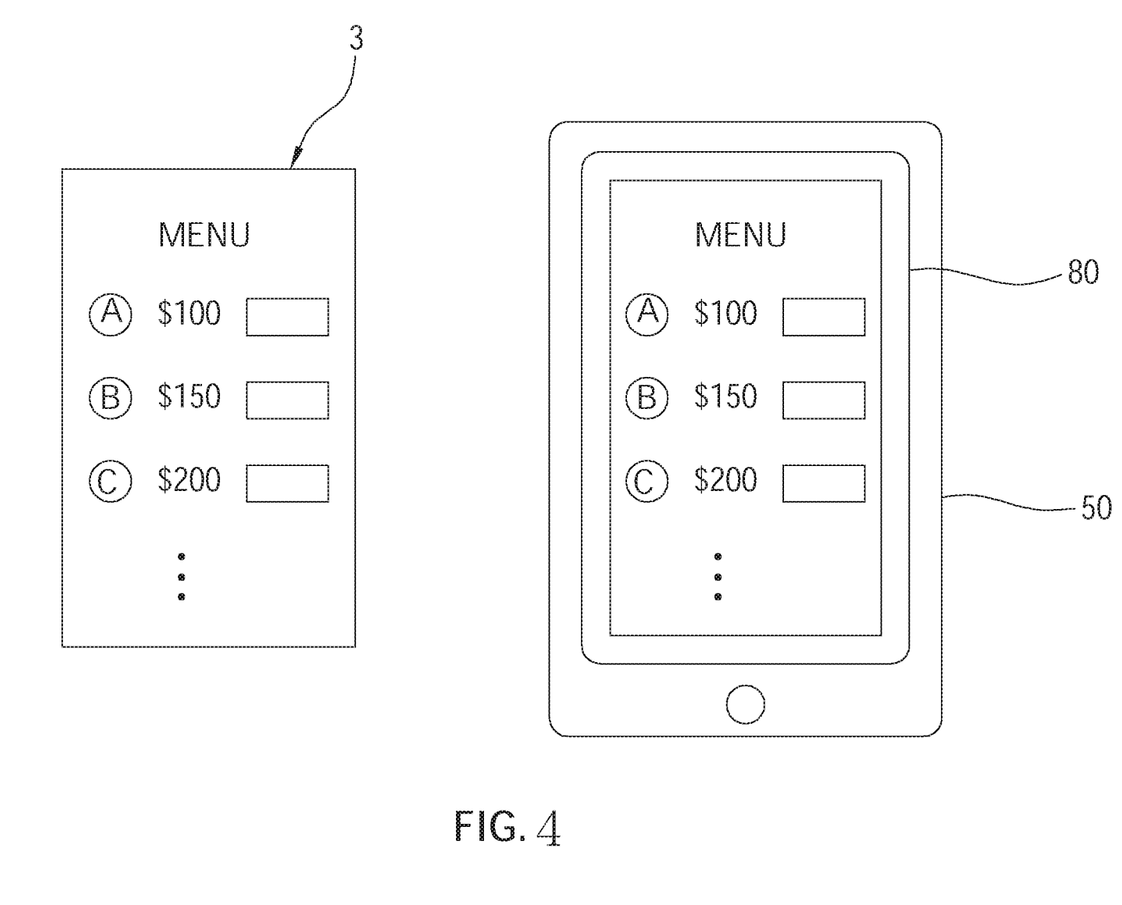
FIG. 4 is a schematic view of photographing a menu with an electronic device of the second embodiment.

The first electronic device 50 can be a tablet computer. The seller can capture images of corresponding products of at least one sales target with the first electronic device 50. As shown in FIG. 4, the seller can be a restaurant, for example. The seller utilizes the first electronic device 50 to capture images of the products, for example, a menu 3, to generate a first graphic 80. Wherein, the menu 3 includes one or more meals of the restaurant. For example, the menu 3 includes Meal A, Meal B, and Meal C, etc. Besides, in one embodiment, the first graphic 80 can include an original graphic generated by photographing the menu 3 and a description tag added to the original graphic. For example, the information shown in the description tag can be related to some sold-out meals and is used to remind the consumers not to order the sold-out meals. For other purposes, the information shown in the description tag can include a special promotion, such as today's special, categories of tastes, such as sour, spicy, or sweet, etc., or vegetarian/non-vegetarian of the meals. However, it is not limited thereto.

Next, the seller can transmit the first graphic 80 to the host 60 via the first electronic device 50, and enable the customers to browse and download the first graphic 80. For example, in this embodiment, the host 60 includes a computer and a communication module. Wherein, the computer is capable of storing one or more first graphics 80. Each of the first graphics 80 can include a different sales target respectively, such as appetizers, main courses, dessert, or drinks, etc. The communication module is connected to the computer, and is adapted to communicate with the first electronic device 50 and the second electronic device 70.

Figure 5:
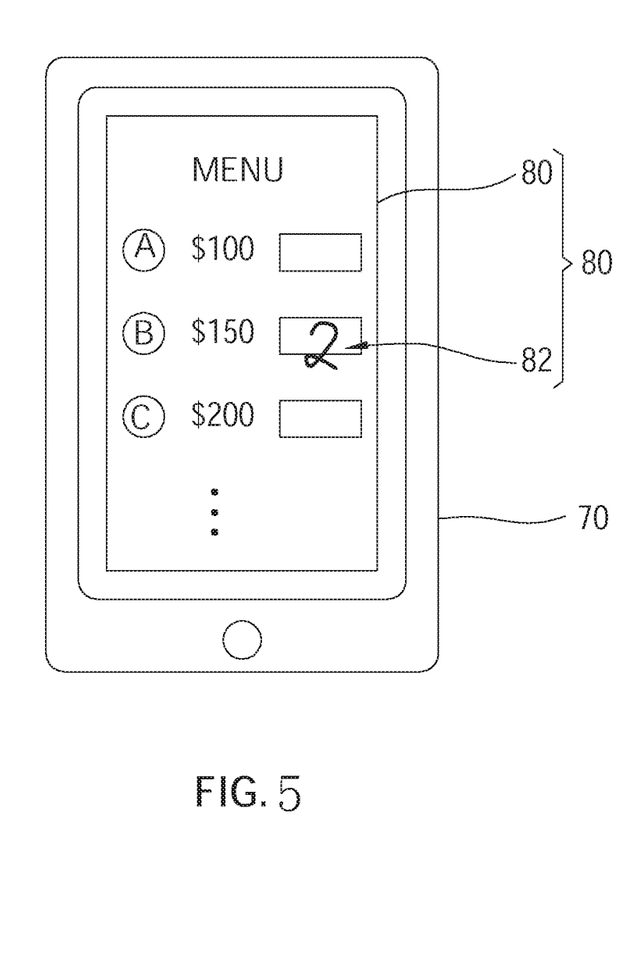
FIG. 5 is a schematic view of adding a first tag to the first graphic of the second embodiment.

As shown in FIG. 3 to FIG. 5, when a customer comes to the restaurant and wants to order some meals, the host 60 can provide the first graphic 80 to the customer's side via the communication module. For example, the host 60 can transmit the first graphic 80 to the second electronic device 70 of the customer and to display the first graphic 80 for the customer. Moreover, in one embodiment, the customer also can directly download the first graphic 80 from the host 60 via the second electronic device 70, rather than waiting the host 60 to provide the first graphic 80.

In addition, in one embodiment, the customer can order his meal on the host of the restaurant through the internet before going to the restaurant, or can download the first graphic from a service platform having the first graphic of the restaurant and transmit back a second graphic to order his meal via internet connection. That is, it is not limited for the customer to order the meal until he arrives the restaurant.

Thereafter, as shown in FIG. 5, on the customer's side, the customer can use the second electronic device 70 to edit the first graphic 80, such as adding a first tag 82 onto the first graphic 80. For example, in this embodiment, the customer can touch the touch screen on the second electronic device 70 to add the first tag 82 including a choice of ordering two of Meal B. Then, after editing the first graphic 80, the customer can control the second electronic device 70 to transmit a second graphic 84 including the first graphic 80 and the first tag 82 to the host 60.

When the host 60 receives the second graphic 84 transmitted from the customer, the host 60 will notify the counter staff of the restaurant to check and identify the second graphic 84 having the first tag 82 and the meals related to the first tag 82 so as to generate a first list. Then, the first list is used to confirm the ordered meals and produce an order form. In one embodiment, the method can further include steps of transmitting the first list having the two of Meal B referred by the first tag 82 from the host 60 to an electronic device 90 of the kitchen of the restaurant, i.e., a meal preparation end, for the staffs at the kitchen to prepare the meals corresponding to the first list. Upon receiving a response from the electronic device 90, the host 60 will provide the response to an electronic device 95 of the service site of the restaurant, i.e., a service end, to notify the service staff to serve the meals corresponding to the first list to the customer.

The advantage of the graphic transaction method of the present invention is as follows: On the seller's side, the seller can utilize his smartphones or cameras to transform a physical menu into a first graphic by an image capturing method directly. The seller can build up an electronic menu for the customers to browse and download. Next, on the customer's side, the customer can add a first tag onto the first graphic, such as adding a circle or a note, and transmit a second graphic including the first graphic and the first tag back to the seller. The seller can obtain the information of the ordered meal of the customer from the second graphic easily. That is, the transaction model between the buyers and the sellers is set up based on graphics. It can provide intuition-type graphics and connections between the tags for mutual sides so as to realize the purpose of fast interaction between the buyers and the sellers. Especially, the build-up method of the aforementioned graphic transaction system is quite simple. As long as the electronic devices capable of photographing or scanning for transforming the products of the sales targets into graphics are available, the graphic transaction method of the present invention can be proceeded. It is especially suitable for modularized reproduction and commercialization.

Figure 6:
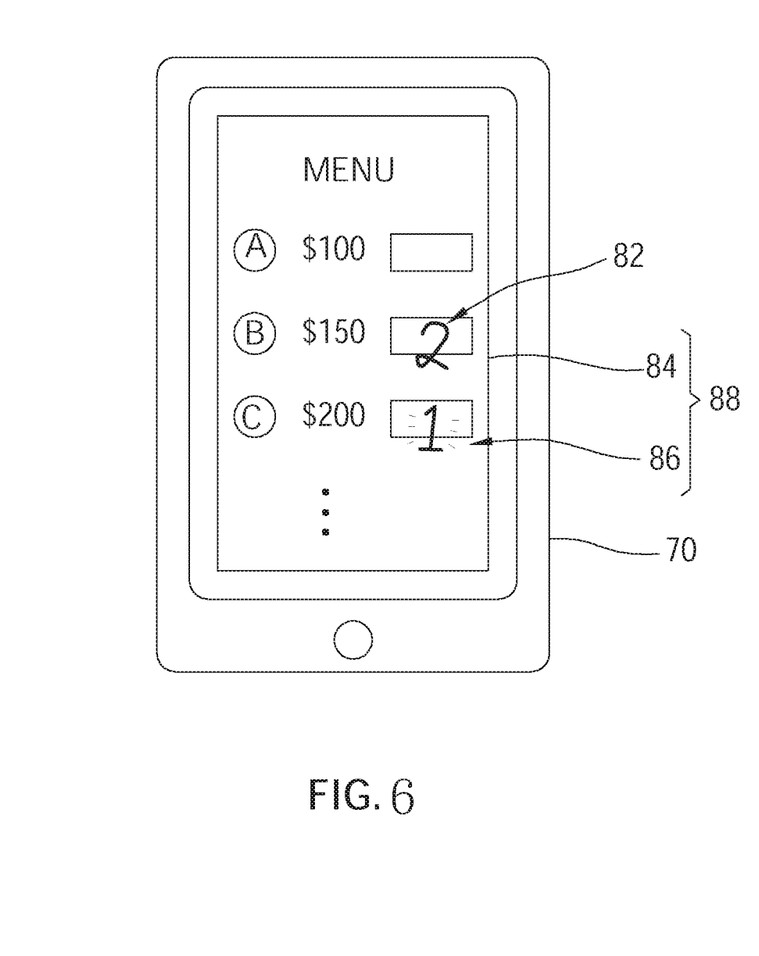
FIG. 6 is a schematic view of adding a second tag to the second graphic of the second embodiment.

In addition, it is worth to mention that, in one embodiment, when the customer wants to add a meal after his first ordering, the customer can send out a request of adding a meal to the host 60 or the first electronic device 50 by utilizing the second electronic device 70. Next, the seller can provide the second graphic 84 to the customer via the host 60 or the first electronic device 50 again, and wait for the response from the customer. Wherein, the second graphic 84 provided by the seller can be the graphic transmitted by the customer for the first ordering, or a graphic including the second graphic 84 and a first bill added thereon. As shown in FIG. 6, upon receiving the second graphic 84, the customer can add a second tag 86 onto the second graphic via the second electronic device 70. For example, in this embodiment, the second tag 86 includes an expression of adding a Meal C. After editing the second graphic 84, a third graphic 88 constituted by the second graphic 84 and the second tag 86 is transmitted back to the host 60 or the first electronic device 50 of the seller. The process of adding a meal is then accomplished.

Upon receiving the third graphic 88 transmitted from the customer's side, the host 60 or the first electronic device 50 of the seller can identify the third graphic ad generate a second list according to the second tag 86 and the sales target, i.e., Meal C, related to the second tag which are included in the third graphic. Then, the seller can proceed the following process, such as preparing and serving the meal, according to the second list.

In order to enhance the difference between the first tag 82 and the second tag 84 for identification purpose, in one embodiment, the first tag 82 and the second tag 84 are displayed with different formats respectively. For example, in this embodiment, the second tag 86 is displayed with a lightening-format. Besides, for other applications, other formats such as different colors or other types of expression can be provided as choices for the seller or the customer. It is not limited thereto. For example, in one embodiment, the first tag at the first ordering of the customer can be formed in a blue-writing, while the second tag at the second ordering, i.e., adding a meal, of the customer can be formed in writings with a color different from the blue color, such as a red-writing. Whereby, the difference between the notes of the first ordering and the second ordering can be identified.

In addition, in this embodiment, the added tags including a writing or a trajectory formed by an operation of the user on the electronic device is used as an example only, it is not limited thereto. For example, in one embodiment, the aforementioned tags can be stampings, patterns, or drawings produced by an operation of the user on the electronic device. Wherein, each of the stampings, patterns, or the drawings can include a different expression respectively. For example, the plural stampings, patterns or drawings can be defined to represent different expressions of the system. The expressions can include, for example, selecting a meal and adding a flavor to the selected meal, such as non-spicy, less spicy or mild spicy, etc., adding a choice of vegetarian/non-vegetarian, calories, nutrition, the season for only, or limited supply, etc. The expressions can be provided for an ordering reference for the customer and enable the customer to choose his favorite flavor. For example, the customer can add a tag related to flavor adjustment to the graphic to request the seller to provide a customized meal.

Moreover, in the second embodiment, the aforementioned configuration, i.e., the host, set up by the seller is used as an example, but in other applications, it is not limited thereto. The system configuration of the second embodiment also can employ a communication software as utilized in the first embodiment. For example, the seller, i.e., the restaurant, can utilize the application program of the communication software to set up an on-line store on the server of the communication software. Next, the seller can upload the first graphics related to the meals to the on-line store on the server. The seller also can upload the pictures, address, contact method, business hours, and activity information to the on-line store on the server for the customer to download related information of the seller via connecting to the on-line store. The customer also can download the menu, i.e., the first graphic to order a meal or making a reservation. After ordering the meals by the customer, the second graphic including the ordered meal can be transmitted to the seller via the communication software and can be proceeded with a billing process. Besides, on the seller's side, the seller also can amend or renew the information on the on-line store. For example, when the meals provided on the menu are changed, the seller can amend the menu included in the first graphic depending on his requirement at any time. Whereby, as compared to the method of employing physical menus, it is more convenient for the amendment and can increase its efficiency, and also can reduce the cost for changing the menu.

Besides, the method for obtaining the information of the seller is not limited to be actively downloaded by the customer. For example, when the customer visits the homepage of the on-line store, the server can actively provide the information of the seller to the customer, such as providing the menu of the seller into the dialogue window of the customer via the communication software. Meanwhile, the customer can interact with the seller via the communication software. For example, the seller can ask the seller about the features of the menu, or the reservation information. At the same time, the server can count a predetermined waiting time as a reference and provide it to the customer according the number of the customers, the number of the ordered meals, the number of waiting customers, and the preparation time of the meals, etc. The customer can decide whether to make a reservation and order a meal depending on the information.

It is worth to mention that the first graphic provided by the seller is not limited to static graphics. For example, the seller can upload a first video composed of plural first graphics, or a dynamic graphic composed of plural first graphics to the on-line store or the server. The first video or the dynamic graphic can be browsed and downloaded by the customer, and utilized as a reference for the customer to order meals. Wherein, the first video or the dynamic graphic can be displayed with a cooking process of some specific meals to attract or increase customer's interest to the meals. In addition, in one embodiment, a device for generating smells also can be added so as to provide a smell experience of the meal for the customers.

It must be pointed out that the embodiments described above are only some embodiments of the present invention. It is worth to mention that the customer's side is not limited to the electronic devices owned by the customers, it can be the electronic device provided by the seller. Meanwhile, the electronic device can be portable electronic devices, or computers or tablet computers provided in the store of the seller. However, it is not limited thereto. In addition, the graphic transaction method of the present invention can be utilized in various industries, and it is not limited to a clothing store or a restaurant. For example, the graphic transaction method can be utilized by a hypermarket or a service supplier. Wherein, for the hypermarket, the preparation side can include the electronic device used by the stocking personnel, and the service side can include the electronic device used by the logistic personnel. It shall be noted that the first graphic, the second graphic, and the third graphic of the present invention are not limited to static graphics, and can be a dynamic graphic, such as a GIF, or a dynamic video composed of plural graphics. The tags added to the graphics are not limited to trajectory, writings, letters or graphics, and can be digital audios.

All equivalent structures which employ the concepts disclosed in this specification and the appended claims should fall within the scope of the present invention.

What is claimed is:

1. A graphic transaction method, comprising:
   photographing a product corresponding to at least one sales target to form at least one first graphic;
   providing the at least one first graphic to a customer's side;
   receiving a second graphic transmitted back from the customer's side, the second graphic including the at least one first graphic and a first tag added to the at least one first graphic by the customer's side; and
   identifying the second graphic and generating a first list according to the first tag.

2. The graphic transaction method of claim 1, wherein the step of receiving the second graphic transmitted back from the customer's side further comprises:
   providing the second graphic to the customer's side; and
   receiving a third graphic transmitted back from the customer's side, the third graphic including the second graphic and a second tag added to the second graphic by the customer's side.

3. The graphic transaction method of claim 2, wherein the first tag and the second tag are displayed with different formats.

4. The graphic transaction method of claim 2, further comprising:
   identifying the third graphic to generate a second list according to the second tag.

5. The graphic transaction method of claim 1, wherein the first graphic is a panoramic image, and the panoramic image includes a plurality of sales targets.

6. The graphic transaction method of claim 1, wherein the step of identifying the second graphic further comprises:
   providing the first list to a preparation side, the preparation side preparing corresponding sales targets according to the first list; and
   waiting for a response from the preparation side, and contacting a service side upon receiving the response to deliver the corresponding sales targets to the customer's side according to the first list.

7. The graphic transaction method of claim 1, wherein the step of photographing the product corresponding to the at least one sales target further comprises:
   photographing the product corresponding to the at least one sales target to form an original graphic; and
   adding a description to the original graphic to generate the first graphic including the original graphic and the description.

8. The graphic transaction method of claim 1, wherein the step of photographing the product corresponding to the at least one sales target further comprises photographing the product corresponding to the at least one sales target for multiple times to generate a plurality of first graphics and form a first video including the first graphics; the step of receiving the second graphic transmitted back from the customer's side further comprises capturing the at least one first graphic from the first video by the customer's side and adding the first tag to the at least one graphic.

9. A graphic transaction system, comprising:
- a first electronic device, adapted to photograph a product corresponding to at least one sales target to form a first graphic;
- a server, connected with the first electronic device and adapted to receive and store the first graphic transmitted from the first electronic device; and
- a second electronic device, connected with the server, the second electronic device being adapted to receive the first graphic from the server, generate a second graphic by adding a first tag to the first graphic, and transmit the second graphic back to the server.

10. The graphic transaction system of claim 9, wherein the first graphic includes an original graphic of the product corresponding the at least one sales target, and a description added to the original graphic.

11. The graphic transaction system of claim 9, wherein the first electronic device is adapted to photograph the product of the at least one sales target for multiple times and generate a plurality of first graphics so as to form a first video including the plurality of the first graphics; the server is adapted to receive the first video and transmit the first video to the second electronic device; the second electronic device is adapted to capture the at least one first graphic from the first video and add the first tag to the at least one first graphic so as to form the second graphic, and transmit the second graphic back to the server.

12. A graphic transaction system, comprising:
- a first electronic device, adapted to photograph a product corresponding to at least one sales target to form a first graphic;
- a server, connected with the first electronic device and adapted to receive and store the first graphic transmitted from the first electronic device; and
- a second electronic device, connected with the server, the second electronic device being adapted to receive the first graphic from the server, add a first tag to the first graphic, and transmit the first tag back to the server; wherein, the server is further adapted to receive the first tag, generate a second graphic by editing the first graphic and the first tag, and provide the second graphic to the first electronic device.

13. The graphic transaction system of claim 12, wherein the first graphic comprises an original graphic of the product corresponding to the at least one sales target, and a description added to the original graphic.

* * * * *